(12) United States Patent
Marusi et al.

(10) Patent No.: US 9,848,037 B2
(45) Date of Patent: Dec. 19, 2017

(54) SYSTEM FOR DISPLAYING CONTENT

(71) Applicant: WATCHEVER GROUP, Paris (FR)

(72) Inventors: Julien Marusi, Marseilles (FR); Franck Charrier, Allauch (FR)

( * ) Notice: Subject to any disclaimer, the term of this patent is extended or adjusted under 35 U.S.C. 154(b) by 48 days.

(21) Appl. No.: 14/411,772

(22) PCT Filed: Jun. 27, 2013

(86) PCT No.: PCT/EP2013/063573
§ 371 (c)(1),
(2) Date: Dec. 29, 2014

(87) PCT Pub. No.: WO2014/001480
PCT Pub. Date: Jan. 3, 2014

(65) Prior Publication Data
US 2015/0172370 A1    Jun. 18, 2015

(30) Foreign Application Priority Data
Jun. 27, 2012   (EP) .................................... 12173830

(51) Int. Cl.
*H04L 29/08* (2006.01)
*H04L 29/06* (2006.01)

(52) U.S. Cl.
CPC ............. *H04L 67/10* (2013.01); *H04L 65/40* (2013.01); *H04L 65/4084* (2013.01); *H04L 65/80* (2013.01)

(58) Field of Classification Search
CPC ..... H04L 65/40; H04L 65/4084; H04L 65/80; H04L 67/10
See application file for complete search history.

(56) References Cited

U.S. PATENT DOCUMENTS 6,728,763 B1 * 4/2004 Chen ................ G06F 17/30902
                                                                 370/316
8,965,421 B1 * 2/2015 Sanjeev .................. H04W 4/14
                                                                 455/414.1

(Continued)

FOREIGN PATENT DOCUMENTS

| EP | 1193944 | 3/2002 |
| WO | WO 2011/071423 | 6/2011 |
| WO | WO 2012/018300 | 2/2012 |

*Primary Examiner* — Arvin Eskandarnia
*Assistant Examiner* — Gil H. Lee
(74) *Attorney, Agent, or Firm* — Pearl Cohen Zedek Latzer Baratz LLP

(57) ABSTRACT

The invention describes a system and a method for displaying content on a first device by using a second device. In an exemplary system, the first device comprises a first display, a first transmitter for transmitting a first identification message comprising information for identifying the first device, and a first receiver for receiving content. The second device comprises input means for receiving input from a user, specifying specific content to be displayed at least on the first display, control means for creating a command message based on the user input, and a second transmitter for transmitting a second identification message and the command message. The server comprises receiving means for receiving the identification messages and the command message, server control means for establishing a logic relationship between at least the first device and the second device based at least on the first and second identification messages and for providing a first instruction for the first device based on the logic relationship and the command message, content providing means for providing content based on the first instruction, so that the content can be displayed at least on the first display.

14 Claims, 6 Drawing Sheets

(56) References Cited

U.S. PATENT DOCUMENTS

| | | | |
|---|---|---|---|
| 2006/0234743 A1* | 10/2006 | Fritsch | H04W 60/00 455/514 |
| 2011/0004894 A1* | 1/2011 | Newberry | H04N 7/15 725/25 |
| 2012/0013524 A1* | 1/2012 | Stuart | G06F 3/1454 345/2.2 |
| 2012/0117587 A1* | 5/2012 | Pedlow | H04N 21/4122 725/25 |
| 2013/0097239 A1* | 4/2013 | Brown | H04L 67/02 709/204 |
| 2015/0237077 A1* | 8/2015 | Suryavanshi | H04L 65/1083 709/204 |

\* cited by examiner

SYSTEM FOR DISPLAYING CONTENT

CROSS-REFERENCE TO RELATED APPLICATIONS

This application is a National Phase Application of PCT International Application No. PCT/EP2013/063573, International Filing Date Jun. 27, 2013, claiming priority of European Application EP 12173830.6, filed Jun. 27, 2012, which are hereby incorporated by reference.

FIELD OF THE INVENTION

The present invention relates to a system and a method for displaying content on at least one first device by using a second device.

BACKGROUND OF THE INVENTION

Modern data communication systems provide high data transfer rates and thus allow to transmit content, e.g. multimedia content, such as text, images, photos, audio, video, etc. However, presently available systems and methods for displaying and/or transmitting multimedia content on a specific device are cumbersome and not very convenient.

It is an object of the present invention to provide a system that allows to easily display and/or play content, e.g. multimedia content, on a first device using a second device.

This problem is solved by the subject matter of the independent claims. The dependent claims define advantageous embodiments of the invention.

SUMMARY OF THE INVENTION

According to an embodiment, the invention relates to a multimedia system that comprises a first device, a second device, and a server. The first device may comprise a first display, a first transmitter for transmitting a first identification message, and a first receiver for receiving multimedia content. The first identification may, for example, comprise information for identifying the first device. The second device may comprise input means for receiving input from a user, the input from the user specifying specific content to be displayed or at least proposed to be displayed at least on the first display. The second device may further comprise control means for creating a command message based on the input from the user, the command message comprising instructions for displaying the specified content, and a second transmitter for transmitting a second identification message comprising information for identifying the second device, and for transmitting the command message. The server may comprise receiving means for receiving the first and second identification messages and for receiving the command message, server control means for establishing a logic relationship between at least the first device and the second device based at least on the first and second identification messages and for providing a first instruction for the first device based on the logic relationship and the command message, and content providing means for providing content based on the first instruction to the at least one first device, so that the content can be displayed at least on the first display associated with the first device.

In a preferred embodiment, the first device and the second device are connected to the server via the Internet.

In a preferred embodiment the server is connected to at least one data base and is configured to retrieve user information and/or device information from said at least one data base and is further configured to store user information and device information in said at least one data base.

In a preferred embodiment, the server is connected to at least one content storage means and is configured to transfer content, e.g. multimedia content, from the at least one content storage means to the first device.

In a preferred embodiment, the system is configured to allow a user of the second device to initiate the displaying of content, e.g. multimedia content, on the first device.

In a preferred embodiment, the server is further connected to at least another first device and is configured to simultaneously display the same multimedia content on a plurality of connected first devices.

In a preferred embodiment, the system is further configured to allow a user of the second device to initiate the displaying of multimedia content on the plurality of first devices.

In a preferred embodiment, at least one of the first device (or the at least one first device) and the second device (or the at least one second device) is configured to communicate with the server via pull requests.

In a preferred embodiment, the server is configured to communicate with at least one of the first devices and the second devices via push messages.

In a preferred embodiment, the invention relates to a method for displaying content, e.g. multimedia content, on at least one first device using a second device, the method comprising transmitting a first identification message from the first device to a server, the first identification message comprising information for identifying the first device; receiving a user input with an input means in the second device, wherein the user input specifies content, e.g. multimedia content, to be displayed on a display associated with the first device; creating a command message from the received user input in the second device; transmitting the command message and a second identification from the second device to the server; receiving the first identification message, the second identification message and the command message in the server; determining a logic relationship between the first device and the second device and, based on the logic relationship and the command message, transmitting content, e.g. multimedia content, to the first device.

In a preferred embodiment, the method further comprises retrieving user information and device information from a data base and storing device information and/or user identification in said data base.

In a preferred embodiment, the method further comprises communicating with the server via pull requests.

In a preferred embodiment, the method further comprises communicating with at least one of the first device and the second device using push messages.

In a preferred embodiment of the method, the server is connected with a plurality of first devices and allows a user of the second device to initiate the displaying of multimedia content on the plurality of first devices.

Preferably, the inventive system and method is configured to serve a plurality of first devices and a plurality of second devices of identical and of different users and allows to group the various devices in a plurality of groups, wherein each of the plurality of groups of devices can be served independently and wherein groups of devices display the same content simultaneously.

DETAILED DESCRIPTION OF THE INVENTION

Figure 1:
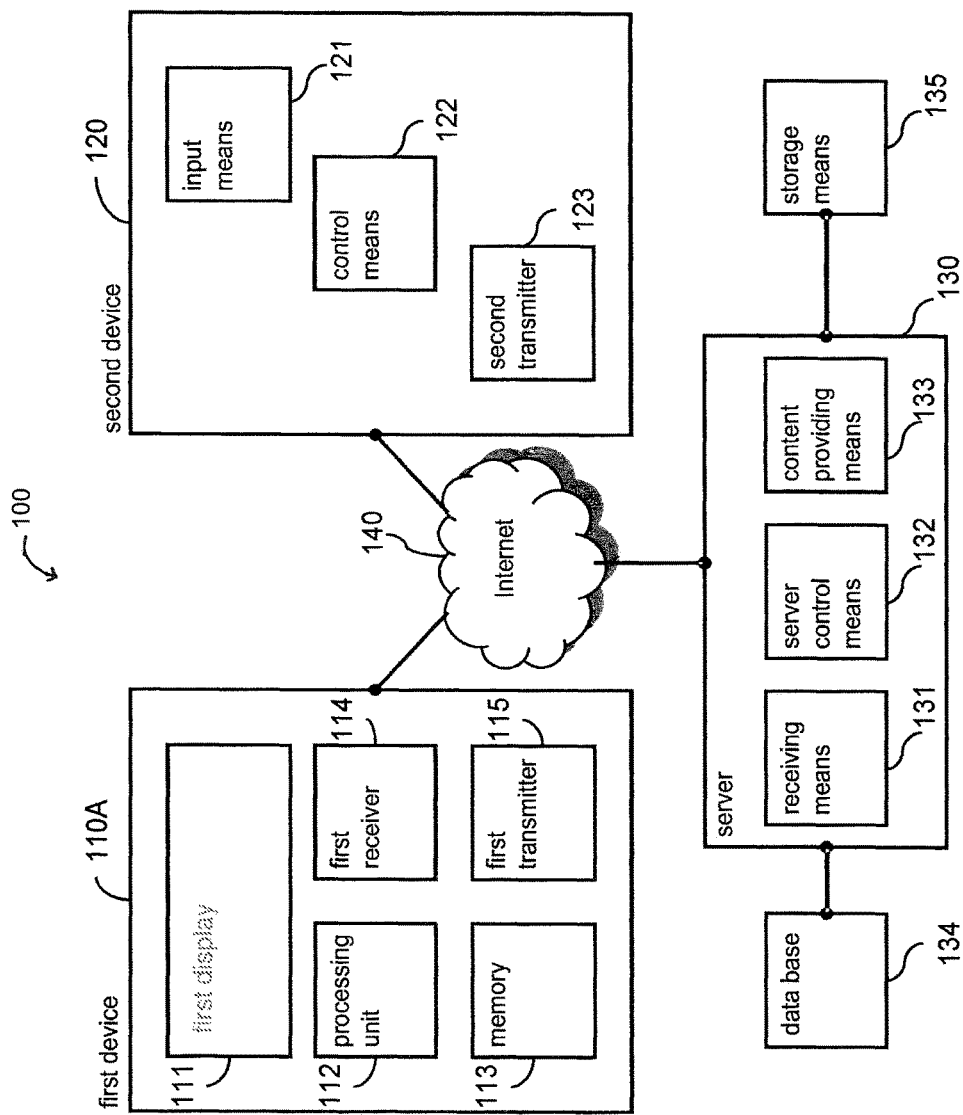
FIG. 1 schematically illustrates an exemplary system for displaying content on a first device using a second device.

FIG. 1 schematically illustrates an exemplary multimedia system 100 according to the invention. The multimedia system 100 comprises a first device 110A, a second device 120, and a server 130.

In the example of FIG. 1, the first device 110A comprises a first display 111 for displaying content, e.g. multimedia content, e.g. for displaying text, images, photos, and/or video, etc. The first device may also (or alternatively) comprise means for playing audio content, e.g. for playing music, voice, etc. For example, the first device 110A may comprise a video display and one or several audio speakers. The first device 110A may, for example, be a TV, a computer, a notebook, a smartphone, a tablet PC (e.g. an Apple iPad tablet computer, a tablet computer using Google Android operating system, a tablet computer using Microsoft Windows operating system etc.). In an alternative embodiment, the first device 110A does not comprise means for directly playing/displaying multimedia content, for example, does not comprise a display and/or speakers, but instead comprises output ports for connecting audio speakers, an audio system, a video display, a TV, etc. For example, the first device 110A may be a set-top box, to which the above-mentioned output means can be connected.

In the following, we will only refer to displaying of multimedia content for the sake of brevity, but every embodiment is also meant to cover playing of audio data, such as voice, music, etc, and to displaying and/or playing content in general.

As illustrated in FIG. 1, the first device 110A may further comprise a processing unit 112, a memory 113, a first receiver 114, and a first transmitter 115.

The processing unit 112 may, for example, be configured to control the first device 110A and/or to process data which has to be processed in the first device 110A. For example, the processing unit 112 may be a suitable central processing unit CPU. The processing unit 112 may also comprise a plurality of general or specific signal processing units.

The memory 113 may, for example, be configured to store an operating system for the first device 110A, to store commands and/or data that are received by the first device 110A, to store commands and/or data that shall be transmitted by the first device 110A, and/or to store data for and/or from the processing unit 112. The memory 113 may also be configured to store content, e.g. multimedia content, that is to be displayed by the first device 110A. For example, memory 113 may be a volatile memory (e.g. a Random Access Memory RAM), a non-volatile memory (e.g. a flash memory, a hard disk, a solid state drive, etc.), or an arbitrary combination thereof. For example, the memory 113 may comprise a volatile memory for storing operational instructions and data that is to be processed, and non-volatile mass-storage (e.g. a hard disk) for temporarily or permanently storing larger amounts of data (e.g. for storing received multimedia data).

As indicated in FIG. 1, the first device 110A may be connected to server 130. Preferably, first device 110A is connected to server 130 via the Internet 140. For example, the first device 110A may comprise a first receiver 114 for receiving instructions and for receiving multimedia content from server 130 via the Internet 140. Further, the first device 110A may comprise a first transmitter 115 for transmitting information (e.g. first identification information) from the first device 110A to server 130 via the Internet 140.

The first receiver 114 may, for example, be configured to connect to the Internet 140 and to receive data and multimedia content from server 130 via the Internet via a wired connection (e.g. via cable), or via a wireless connection (e.g. a Wi-Fi or WLAN connection according to a Wi-Fi/WLAN standard such as IEEE802.11, or a mobile radio connection via a wireless mobile radio communication system such as UMTS, LTE, etc.).

The transmitter 115 may, for example, be configured to connect to the Internet 140 and to transmit data to server 130 via a similar connection, e.g. via a wireless or via a wired connection. Receiver 114 and transmitter 115 may form a combined transceiver unit, or may be realized as separate units. Receiver 114 and transmitter 115 may be connected to server 130 via the same technology, or via different technologies: For example, receiver 114 and transmitter 115 may both use a Wi-Fi connection, e.g. according to IEEE 802.11ac, or one of them may use a wired connection whereas the other one uses a wireless connection.

In a preferred embodiment, the first device 110A comprises a display 111 and is connected to an Internet router via wireless LAN (WLAN) or via LAN cable, and the Internet router connects to the Internet via a suitable Internet service provider, e.g. using DSL, ISDN, or other suitable connections. For example, the first device 110A may be a TV which is connected to the Internet 140.

In the exemplary multimedia system 100 illustrated in FIG. 1, the second device 120 comprises an input means 121, a control means 122, and a second transmitter 123. The second device may, for example, be a tablet computer (e.g. an Apple iPad tablet computer, a tablet computer using Google Android operating system, a tablet computer using Microsoft Windows operating system, etc.), a TV, a computer, a notebook, a smartphone, a Set-Top-Box, etc.

The input means 121 of the second device 120 is preferably configured for receiving user input from a user of the second device 120. The input means 121 is not limited to a specific method for receiving user input, but may use any suitable method for receiving and recognizing user input. For example, input means 121 may be an input means provided by the second device and may allow a user to directly input user input into the second device, e.g. a keyboard unit of the second device 120, a touch screen of the second device 120, a voice control system of the second device 120, etc. For example, the second device 120 may be a personal computer, a notebook computer, a tablet computer, a smartphone, etc. and the input means 121 may be a corresponding user input means provided by said device. In a preferable embodiment, the second device 120 in a tablet computer (e.g. an Apple iPad tablet computer), and the input means 121 comprises the touch screen, voice recognition, and/or all the other input means provided by said tablet computer.

The input means 121 can also be an interface for various input means, e .g. can be a receiver for wireless connection of user input devices (e.g. keyboards, touch pads, etc. connected via Bluetooth wireless connection, WiFi, etc.). Input means 121 can also be an infrared receiver for a standard infrared remote control, etc. Further, the input means may be configured to receive further operating instructions, for example, for setting up a so-called friends list comprising a plurality of other users and/or other first devices, to which the user of said second device 120 wants to connect.

In order to provide the above functions, the second device may, for example, use a web browser which allows connection to server 130, or may use a specific software application or app that is provided by the service provider for a variety of computer systems (e.g. for Windows, Mac, Linux, or Unix operating system, etc.), tablet computers and smart phones (Apple iPhone/iPad, Google Android, etc), TVs, Set-Top Boxes, etc.

The user input may, for example, specify at least one first device 110A on which the user of the second device 120 wants to display content, and the user input may further specify the multimedia content which the user of the second device 120 wants to display on the at least one first device 110A. To specify the at least one first device 110A, the user of the second device 120 may use a previously configured list, e.g. a so-called friends list.

The user input means 121 may be configured to receive said user input and forward the received user input to a control means 122. Control means 122 may be configured to create a command message or a plurality of command messages based on the user input. Examples of command messages created by the control means 122 will be explained further below. The control means 122 may further be configured to forward the command message or the plurality of command messages to a second transmitter 123.

The second transmitter 123 may be connected to server 130 via a wired or wireless connection and may use any of the connection technologies indicated above with regard to the first transmitter 115 (e.g. may be a Wi-Fi transmitter, a mobile station of a mobile radio communication system such as UMTS. LTE, may be connected to server 130 via the Internet using a wired connection such as DSL, ISDN, etc.).

The second device 120 may further comprise a plurality of other components not shown in FIG. 1, e.g. may comprise a processor, a memory, and may also comprise means for displaying (multimedia) content. For example, the second device 120 may also comprise components similar to the ones described above with regard to the first device 110A.

The present invention does not require that the at least one first device 110A and the second device 120 are directly connected, e.g. does not require that both devices are located in the same network (e.g. the same Wi-Fi network). Although the present invention does not exclude a direct communication between first device 110A and second device 120, the communication between the at least one first device 110A and the second device 120 is preferably always carried out via server 130, i.e. first device 110A and second device 120 do only directly communicate with server 130 and do not directly communicate with each other (e.g. thereby skipping the server 130).

In a preferred embodiment, the first device 110A may be a TV, and the second device 120 may be an Apple iPad tablet computer.

As illustrated in the exemplary multimedia system of FIG. 1, server 130 may comprise a receiving means 131, a server control means 132, and a content providing means 133.

Further, server 130 may be connected to a data base 134 for storing and accessing user account and device information, and to a content storage means 135 for accessing and retrieving the multimedia content that is to be displayed on the at least one first device 110A. Data base 134 and content storage means 135 may be remote from the server 130. Data base 134 and content storage means 135 may, for example, be distributed and/or mirrored over various entities, and there may me a plurality of servers for distributing the server traffic and for providing fallback capabilities. Although not shown in the Figures, data base 134 and content storage means 135 may also be integrated in server 130.

The receiving means 131 is preferably configured to receive data from first transmitter 115 (which is arranged in the first device 110A), to receive data from the second transmitter 123 (which is arranged in the second device 120), and to receive command messages from the second device 120, preferably via the Internet 140.

First transmitter 115 and second transmitter 123 may use arbitrary connection technologies to connect to the Internet 140 (e.g. may use wireless and/or wired connections) and receiving means 131 may be accessible by both first transmitter 115 and second transmitter 123 via the Internet as indicated in FIG. 1. Receiving means 131 may further be configured to receive and decode the information from first transmitter 115 and second transmitter 123 and forward the decoded information to server control means 132 in server 130.

Server control means 132 is preferably configured to receive data from receiving means 131 and to access information data base 134. Server control means may further be configured to command content providing means 133 to access content storage means 135 and to initiate a transfer of the requested content, e.g. multimedia content, to the at least one first device 110A. Further, server control means 132 may be configured to transmit instructions (e.g. operating instructions) to the first device 110A. The multimedia content may, for example, be transmitted to the first device 110A via a simple file transfer, as a data steam, etc. The transfer of the multimedia content may use any suitable transfer protocol.

In an embodiment of the invention, the first device 110A and the second device 120 are associated with the same user. For example, the first device 110A is this user's TV, and the second device 120 is said user's iPad tablet computer. In this embodiment, server 130 is configured to identify the first device 110A and the second device 120 as being associated withthe same user, and to allow said user, by using the second device 120, to determine multimedia content from multimedia content storage means 135 to be displayed on said user's first device 110A via server 130.

In another embodiment, the first device 110A is associated with a first user, and the second device 120 is associated with a second, different user. The first user may, for example, be remoted from the second user. In this embodiment, server 130 is configured to identify the first device 110A as being associated with the first user, and the second device 120 as being associated with the second user, and to allow the second user, by using the second device 120, to determine or at least suggest multimedia content from multimedia content storage means 135 to be displayed on the first user's first device 110A via server 130.

Preferably, the multimedia system is configured to allow the same content to be displayed to various users simultaneously, and to further allow the respective users to interact with each other while watching the same content.

Preferably, the second device 120 and the first device 110A do not communicate directly with each other, but instead do only directly communicate with server 130. In a preferred embodiment, the requested content, e.g. multimedia content, is not stored on the second device 120 but is only available in the server's content storage means 135. In other words, content is preferably not streamed or transferred directly from the second device 120 to the at least one first device 110A.

Figure 2:
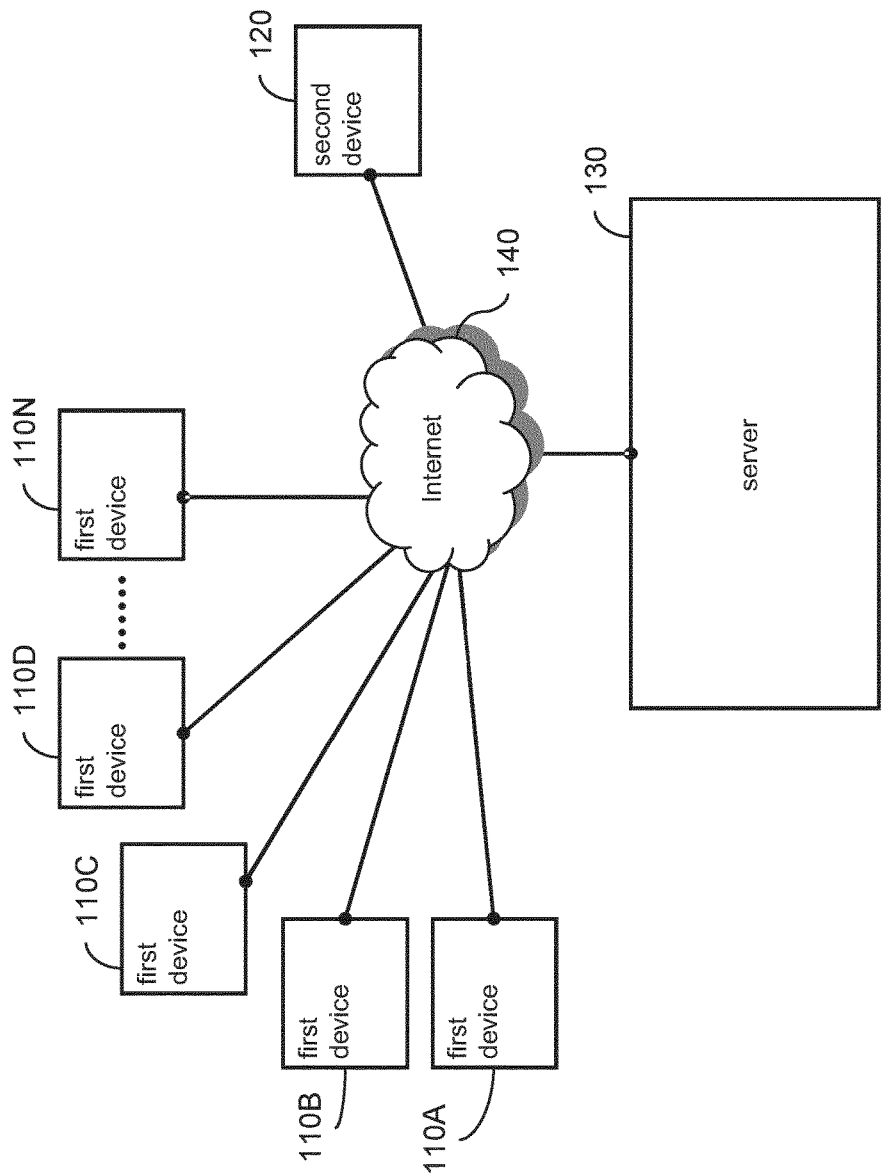
FIG. 2 schematically illustrates a system for displaying content on a plurality of first devices using a second device.

In the embodiment illustrated in FIG. 2, the multimedia system is configured to simultaneously display a requested multimedia content on a plurality of first devices 110A, 110B, 110C, ..., 110N. As illustrated in FIG. 2, the plurality of first devices 110A, 110B, 110C, ..., 110N is connected to a server 130 via the Internet 140. Each of the first devices 110A, 110B, 110C, ..., 110N may be associated with a different user. The second device 120 may be associated with a further, completely different user, or may be associated with a user of one of the first devices 110A, 110B, 110C, ..., 110N. In the example illustrated in FIG. 2, the second device 120 is associated with the same user as the first device 110A, and the other first devices 110B, 110C, ..., 110N are associated with different users. In this example, the user of the second device 120 may select a multimedia content that is available in multimedia content storage means 135 and may initiate that content to be displayed almost simultaneously at a selected number of first devices 110A, 110B, 110C, ..., 110N, including his own first device 110A and at least some of the first devices 110B, 110C, ..., 110N of other users. The embodiment illustrated in FIG. 2 preferably allows a group of friends at remote places to simultaneously watch the same content (e.g. watch the same movie at the same time at different places).

Displaying content simultaneously on a plurality of first devices 110A, 110B, 110C, ..., 110N does, however, neither require nor indicate an absolute synchronisation. Instead, displaying content simultaneously allows for short time offsets (e.g. up to 5, 10, 20, 30, 40, 50, 60 seconds) in order to allow for sufficient time for processing and transmission of data, server response delays, etc.

The operation of an exemplary multimedia system will now be explained with regard to FIG. 1:

The first device 110A, or the plurality of first devices 110A, 110B, 110C, ... 110N, each have to register with server 130, so that the server 130 is informed on which first devices 110A, 110B, 110C, ... 110N are available in the system. Thus, in a first step, the first transmitter 115 in the at least one first device 110A transmits a first identification message to receiving means 131 in server 130. The first identification message is configured for identifying the first device 110A to server 130.

A user of the second device 120 may then input a user input into the second device 120 so as to specify, for example, a specific content (e.g. a certain movie) and at least one first device 110A on which the multimedia content (e.g. the movie) is to be displayed (or at least proposed to be displayed).

The user input is received by input means 121 (e.g. may be electronically received, decoded, and processed) and is then forwarded to the control means 122. Based on the user input received from input means 121, control means 122 creates a command message, which is then forwarded to second transmitter 123 and transmitted to receiving means 131 in server 130. The command message created by control means 122 specifies to server 130, which content the user of the second device 120 wants to be displayed and on which of the plurality of available first devices 110A, 110B, 110C, ..., 110N the multimedia content should be displayed.

Further, second transmitter 123 transmits a second identification message to receiving means 131 in server 130. The second identification message preferably comprises information for identifying the second device to server 130. The second identification message and the command message from second transmitter 123 in second device 120 may be transmitted as separate messages, or may be transmitted in a combined message.

Receiving means 131 in server 130 receives the first identification message from first transmitter 115, the second identification message from second transmitter 123, and the command message from the second transmitter 123. Receiving means 131 forwards the received identification and command messages to server control means 132 in server 130.

Server control means 132 may then be configured to access data base 134 in order to verify and authorize access of the first device 110A and of the second device 120. Further, server control means 132 may access user data base 134 to retrieve various information regarding the specific properties and capabilities of the respective first device 110A and/or the respective second device 120.

If both devices are authorized to access server 130, server control means 132 evaluates the command message received from the second device 120 and accesses multimedia content storage means 135 to check whether the requested multimedia content is available in multimedia content storage means 135.

If the desired multimedia content is available in multimedia content storage means 135 and is available for the first device 110A (e.g. is covered by a subscription of the user of the second device 120 and/or the user of the first device 110A), server control means 132 initiates the transmission of first instructions to the first device 110A (e.g. containing information on the multimedia content that is to be displayed and/or requesting permission from a user of the first device 110A to display the content), and if all required approvals have been received, initiates transmission of the requested multimedia content from multimedia content storage means 135 via content providing means 133 to the first device 110A. First device 110A receives the transmitted multimedia content (e.g. via first receiver 114) and starts to display the multimedia content.

Figure 3:
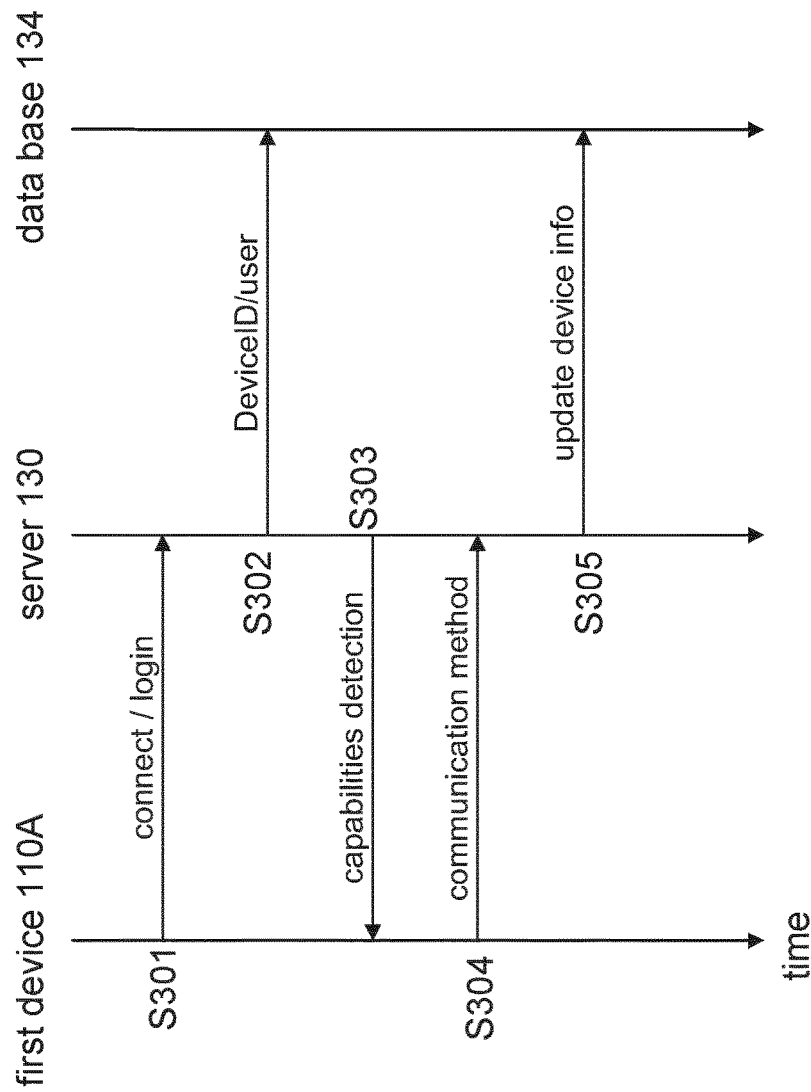
FIG. 3 schematically illustrates a method for registering a first device.

In order to access server 130 in multimedia system 100, each of the first devices 110A, 110B, 110C, ..., 110N has to be registered with server 130. FIG. 3 shows an exemplary method for registering a first device 110A with server 130.

The method starts in step S301, wherein a first device 110A connects to the server 130 and logs into the system.

In some embodiments, in order to log into the system, a user of the first device 110A may first have to create an account. In order to create an account, the user may, for example, be required to browse to a specific website using a web browser or to register using a specific app which may be provided for a large variety of systems, e.g. for computers, smartphones, tablets, TVs, etc. Account creation may also be possible via telephone or some other means. Creating an account may require a user to provide user information, such as credit card number, address of residence, age, email address, etc. Creating a user account may further require validation of the entered data, for example a verification of the email address by replying to an email sent to the entered email address. Creating an account may further require the user to order a submission to a specific service, e.g. in order to access specific contents (e.g. movies).

After an account has been created, the server 130 may, for example, respond to said user by providing login information, for example by providing a unique user name and a password. This login data may then be used by the user to log on to the system as indicated by step S301.

In a preferred embodiment, in order to register a first device 110A, the user logs on to the system via said first device 110A, e.g. using a web browser on said first device, or using a specific app that is provided by the server operator for that specific type of device (e.g. if a specific TV is used, an app provided for said TV). As an alternative, the user may also register a new device by entering the required data manually.

As indicated by step S302, server 130 assigns a unique identifier (a so-called "DeviceID") to the respective first device 110A and transmits the unique identifier and the user information to the data base 134 in order to register the first device 110A with said user account. The device identifier may then be stored together with the user account information in the data base 134.

The unique device identifier may, for example, be based on the IP-address of the first device 110A, a user, account number, an internal device number of the first device 110A, the MAC address of that device, a unique identifier provided by an app running on the first device 110A and/or portions and/or combinations thereof. By entering the device identifier into data base 134, the server 130 logically associates the respective first device 110A with the respective user account.

In a next step S303, the server 130 tries to obtain further information from said first device 110A. Specifically, server 130 may determine capabilities and technical specifications of said first device 110A, for example by using a capabilities detection library. The device information obtained thereby may, for example, comprise information on the available data transfer rates, screen resolution, available audio equipment, available storage means, and further technical information on how the further communication with the first device 110A is to be carried out. Preferably the obtained device information comprises information on whether the server 130 shall communicate with said first device 110A by pushing data to that device, or whether said first device 110A pulls information from server 130. In other words, the server 130 determines whether future communications with that first device 110A should be achieved by push- or and/or pull-communication.

A push-communication ("server push") describes an internet based communication where the request for a given transaction is initiated by the server 130.

In contrast thereto, in a pull-communication, the request for the transmission of information is initiated by the first device 110A, 110B, 110C, . . . , 110N. For example, when using a pull-communication ("client-pull"), the first device 110A can regularly poll or request for new messages, i. e. ask the server 130 regularly (e.g. every 1, 10, 20, 60 seconds, etc.) in order to check for new information and/or new data.

In step S304, the first device 110A responds to the server 130 by transmitting the requested information. In step S305, the obtained device information, and especially the desired communication method, is stored in the data base 134 by updating the device information for said first device 110A.

With regard to FIGS. 4 and 5, pull and push communication will now be explained in further detail. A pull-communication is indicated in FIG. 4, and a push-communication is indicated in FIG. 5.

Figure 4:
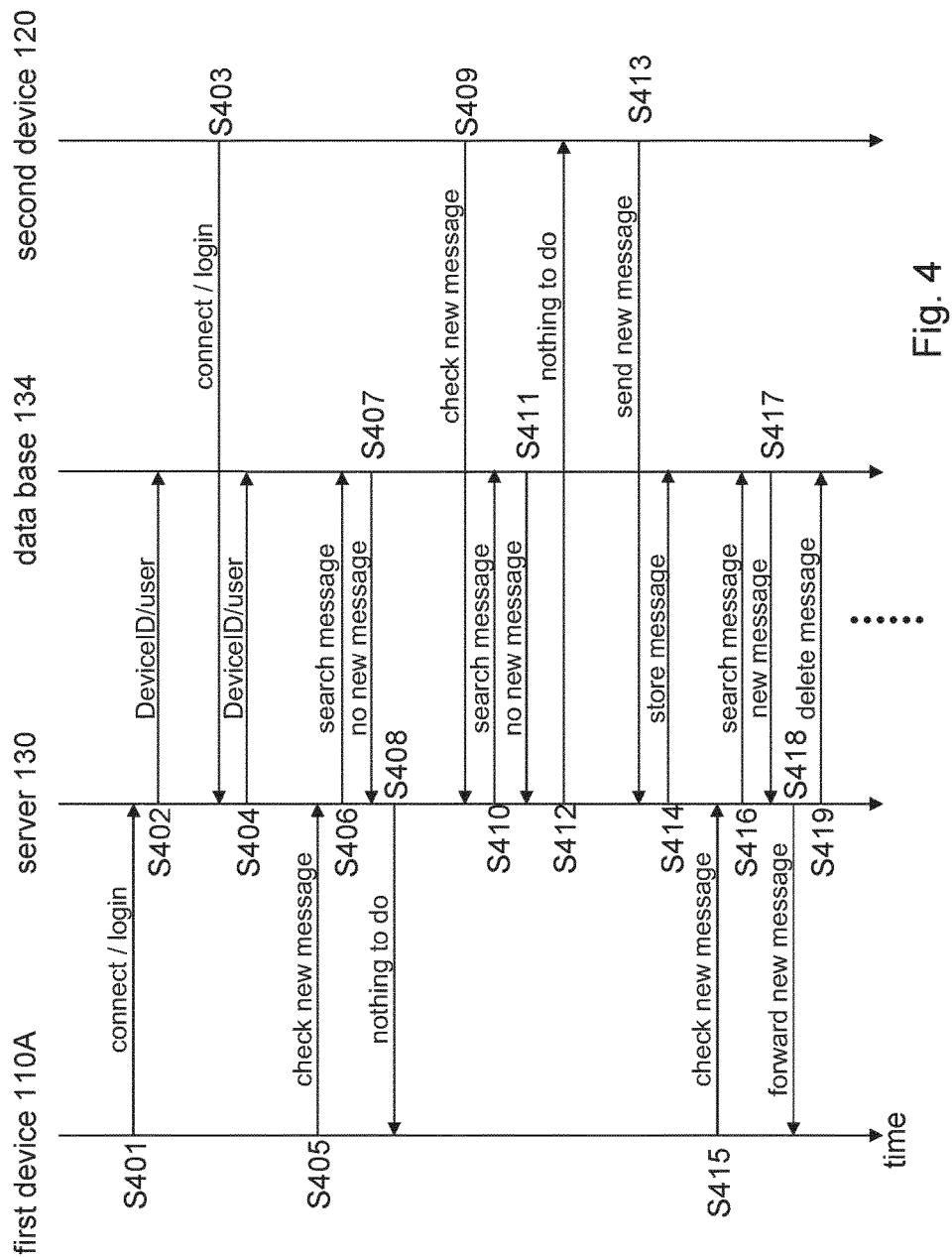
FIG. 4 schematically illustrates an example for a communication between a first device and a second device and a server.
Figure 5:
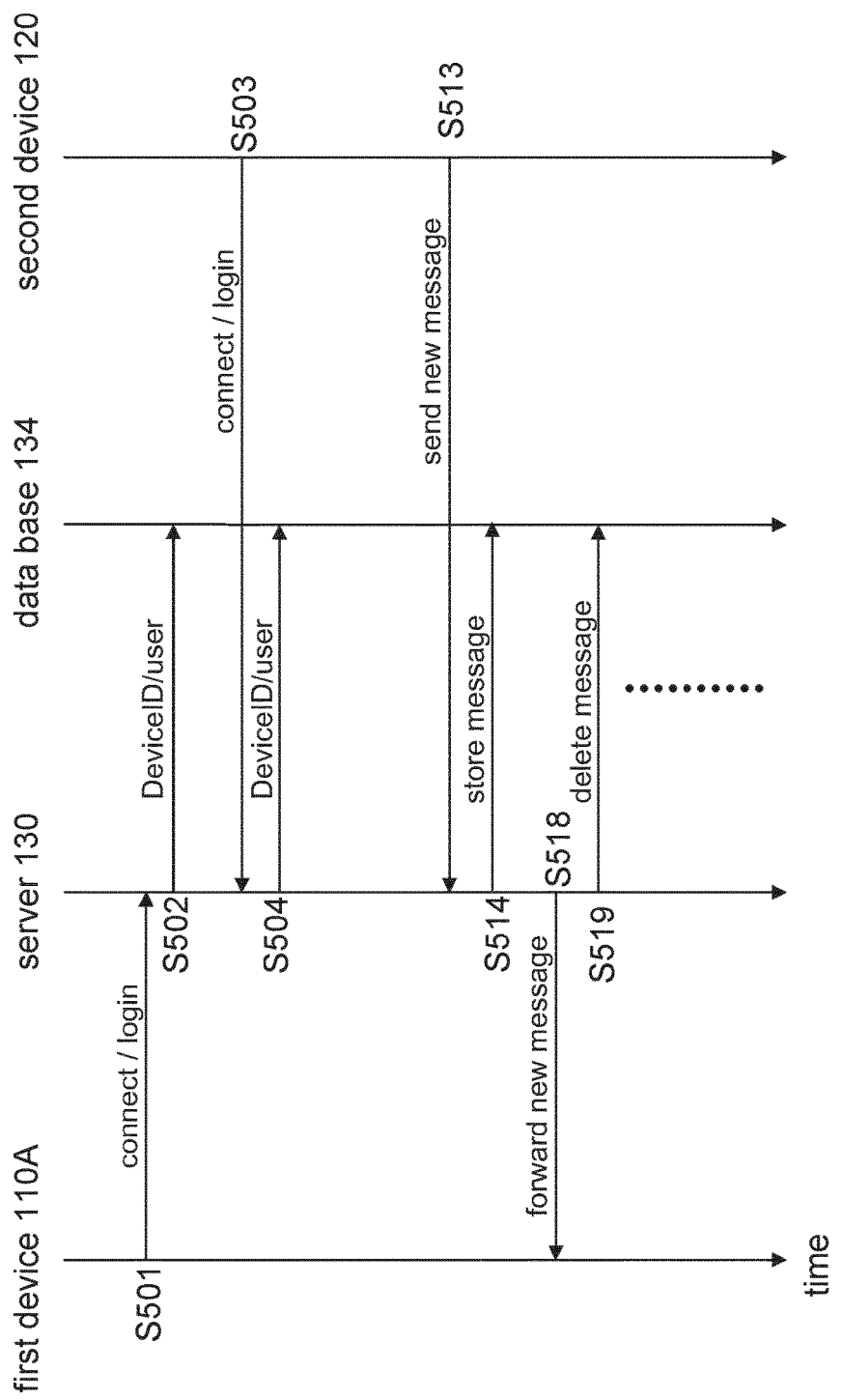
FIG. 5 schematically illustrates an example for a communication between a first device and a second device and a server.

In the example illustrated in FIG. 4, in step S401, a user of a first device 110A logs into server 130 using a first device 110A, and the login information associated with the account of this user. In step S402, the server stores the DeviceID of said first device 110A and the associated user information in data base 134. This information may, for example, allow the system to determine that said first device 110A is running and configured to expect reception of content.

In a later step S403, a second device 120 logs on to the system. In step S404, the server stores an associated DeviceID of the respective second device 120 in data base 134.

Steps S401-S404 roughly correspond to the steps illustrates in FIG. 3. Updating the device information in the data base 134 may be repeated here, but is omitted in the example of FIG. 4, since the server may infer the required information from data base 134.

In the example of FIG. 4, both devices 110A and 120 are using pull-communication, i.e. both devices regularly check for new messages by querying the server.

For example, in step S405, the first device 110A queries server 130 for new messages, i.e. asks server 130 whether there are new messages for said first device 110A. As indicated by step S406, server 130 then checks the data base 134 for new messages for the querying first device 110A and/or the user associated with that device. Data base 134 then responds to the server by forwarding new messages, or by stating that there are no new messages for the querying device and/or the associated user. In the example illustrated in FIG. 4, the data base 134 responds in step S407 by indicating that there are no new messages for the querying device and/or the associated user. The server 130 then indicates to the querying first device 110A that there are no new messages, and/or that there is nothing to do at the moment, step S408.

In step S409, the second device 120 queries server 130 for new messages, i.e. asks server 130 whether there are new messages for said second device 120. As indicated by step S410, server 130 then checks the data base 134 for new messages for the querying second device 120 and/or the user associated with that device. Data base 134 responds to the server by forwarding new messages, or by stating that there are no new messages for the querying device and/or the associated user. In the example illustrated in FIG. 4, the data base 134 responds in step S411 by indicating that there are no new messages for the querying second device 120 and/or the associated user. The server 130 then indicates to the querying second device 120 that there are no new messages, and/or that there is nothing to do at the moment, step S412.

In step S413, the second device 120 sends a message to server 130, e.g. a command message based on a corresponding user input. As indicated by step S414, the server connects to the data base 134 and creates a new entry for the received message, and stores the message in the data base 134. For example, if the message from step S413 is a request that a specific content (e.g. a specific movie) be displayed on the first device 110A, an according entry is stored in the data base for the DeviceID of the corresponding first device 110A and the account of the associated user.

In step S415, the first device 110A performs another pull query, thereby asking server 130 whether there are new messages for said first device 110A. As indicated by step S416, the server 130 checks the data base 134 for new messages for said first device 110A and/or the associated user account. As indicated by step S417, data base 134 responds by transmitting the stored message to server 130, which then forwards the stored message to the first device 110A; as indicated by step S418. As indicated by step S419, the web server 130 continues by deleting the message from the data base 134, e.g. after correct receipt of the message has been confirmed by the respective first device 110A.

After the first device 110A has received the message in step S419 from server 130, said first device 110A evaluates the contents of the message and acts accordingly. For example, if the message indicates that a file transfer has initiated by said second device 120 and will start soon, the first device 110A reacts by preparing reception of the data.

First and second devices 110A and 120 then continue to regularly query the server 130 for new messages.

FIG. 5 shows an example of a first device 110A and a second device 120, wherein both devices use push-communication. As indicated by steps S501 and S503, the first device 110A and the second device 120 log into the system and/or the server 130. The server stores the respective DeviceIDs and/or user information in data base 134, cf. steps S502, S504.

In contrast to the method illustrated in FIG. 4, both devices use push-communication, i.e. do not regularly ask for new messages but instead are informed by server 130 if there are new messages for the respective device. Accordingly, there are no steps that correspond to steps S405-S408 and steps S409-S412.

Instead as shown in FIG. 5, when one of the devices sends a message to server 130 for device 110A, cf. step S513. Server 130 receives that message and stores the message in the data base 134 as indicated by step S514. Then, as indicated by step S518, without waiting for further queries or pull messages, server 130 almost instantly (i.e. as soon as possible) sends a message to the first device 110A, thereby forwarding the message stored in the data base to the first device 110A, cf. step S518. The forwarded message may be adapted to the requirements and capabilities of the respective first device 110A, e.g. may be in a required format that may be different to the format of the command message sent from the second device 120 to the server 130. After the message has been forwarded to the first device 110A in step 518 (and possibly after a confirmation of correct reception of the message by the first device 110A), server 130 deletes the transmitted message from data base 134 as indicated by step S519.

Figure 6:
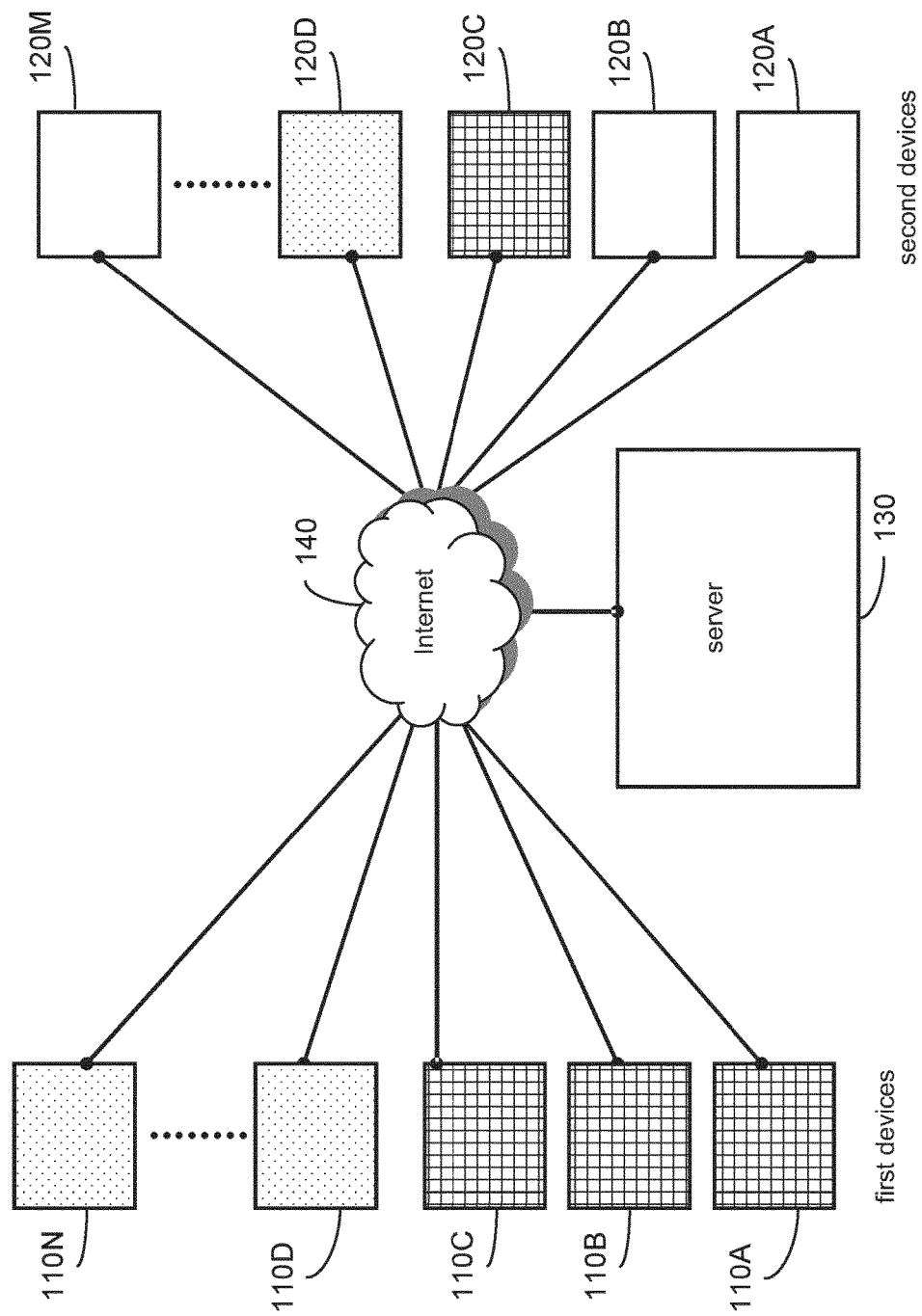
FIG. 6 schematically illustrates a system for displaying content, comprising a plurality of first devices and a plurality of second devices.

Although FIGS. 4 and 5 have shown the communication using one first device 110A, and one second device 120, the present invention is not limited with regard to the number of first and second devices. For example, as already indicated in FIG. 2, the system preferably is configured to serve a plurality of first devices 110A, 110B, 110C, . . . , 110N. Preferably, the system is further configured to serve a plurality of second devices 120A, 120B, 120C, . . . 120M, as indicated in FIG. 6. In the example illustrated in FIG. 6, the second device 120C (tiled hatching) has initiated that a first multimedia content is simultaneously displayed on first devices 110A, 110B, 110C (tiled hatching), whereas the second device 120D (dotted) has initiated a second multimedia content to be simultaneously displayed on first devices 110D-110N (dotted). Thus, server 130 is configured to serve a plurality of first and second devices at the same time, the plurality of devices being grouped into a plurality of groups, with the various groups being independent of each other.

Initiating that a specific multimedia content be simultaneously displayed on a plurality of first devices 110A, 110B, 110C, . . . , 110N, is preferably achieved using a communication scheme as described with regard to FIGS. 4 and 5. For example, the second device 120 may transmit a command message (e.g. a single command message or a plurality of command messages) to server 130 with the command message(s) indicating the desired multimedia content and the plurality of first devices 110A, 110B, 110C, . . . , 110N on which the requeste content should be displayed. This can, for example, be initiated by a user specifying a plurality of other users and/or a plurality of first device 110A, 110B, 110C, . . . , 110N, This can, for example, be achieved by creating and using a so-called friends list, which may be created and updated using a specific app or a web browser, e.g. using a community web page such as Facebook social media platform.

Referring back to FIGS. 4 and 5, although not explicitly shown in the figures, any combination of any number of pull- and push-devices is possible. The pull-devices regularly query the server for new messages, whereas for the push-devices, the server automatically forwards messages stored in the data base for the respective push-device to that push-device.

Further, a user of a second device 120 (e.g. an iPad or an Android Tablet or a Smartphone) may register one or several own devices as first devices 110A, 110B, 110C, . . . , 110N. For example, said user may register his own TV with the server system 130 and use the Tablet PC (e.g. the iPad tablet computer) to start and control displaying of a multimedia content (e.g. a video) on his own TV.

In another preferred embodiment, each user of a second device 120 may enter other users of first devices and/or second devices in a so called friends list to allow content to be displayed on the first devices of these users.

In another preferred embodiment, each user of a second device 120 may enter other users in a friends list in order to allow these other users to initiate displaying multimedia content on this users' first device 110A.

Preferably, the system allows each user to enter one or several first devices and one or several second devices for himself and to enter a plurality of users to display multimedia content on this user's first devices and/or to allow these users to initiate displaying multimedia content on this user's first devices.

In a further embodiment, the system may allow users to exchange information while watching multimedia contents simultaneously. For example, the system may allow users to exchange text messages, images, further audio contents (e.g. voice), etc., so that the users can interact while simultaneously watching multimedia content in remote locations. Such a system allows a first user, for example in Western Europe, to simultaneously watch a movie with a friend sitting in North Europe, and further friends sitting in Southern Europe, and would further allow these friends to simultaneously interact, for example by chatting, communicating with an audio interface, a webcam, or various other interaction possibilities.

In a further embodiment, these interactions can be stored in a data base for a given amount of time, and can be watched again together with all the recorded interactions.

In an embodiment of the invention, the system allows the creation of so-called movie events or TV Show events, where users are able to invite friends in order to watch multimedia content together simultaneously. Preferably, each of these created events may be linked to an event on Facebook or some other web page. While interacting during the movie or TV Show event, the users can share emotions and chat during watching, and each of these interactions can be stored using a content time code which links the interaction to a content time of the respective event. Each of these interactions can have an associated content time code, which can be stored in the data base together with the interaction.

In another embodiment, the multimedia system is configured to allow users to automatically connect to other users which share the same or similar interests. For example, users can enter only information, and/or the system can obtain information with regard to the respective users by evaluating the users activities, such as watching activities, user ratings, Facebook social media plaform-likes (e.g. with regard to actors, directors, movies, TV Shows, etc.). In a preferred embodiment, before new friends are connected as friends, the system. establishes a first event where the users can interact during the event as indicated above and afterwards evaluates whether these users want to be linked together.

It is to be understood that the above exemplary embodiments are intended to illustrate specific embodiments of the invention and are not to be understood in a limiting sense. Further, it is to be understood that the various aspects described herein can be combined unless specifically stated otherwise.

The invention claimed is:

1. A system, comprising:
a first device,
a second device, and
a server,
wherein the first device comprises
a first transmitter configured to transmit a first identification message comprising information for identifying the first device,
a first receiver configured to receive a first instruction and multimedia content from the server, and
a first display configured to display the received multimedia content, and
one or several audio speakers,
wherein the second device comprises
an input device configured to receive a user input, the user input specifying the multimedia content to be displayed at least on the first display,
a controller create a command message based on the user input, the command message comprising instructions for displaying the specified multimedia content, and
a second transmitter, configured to transmit to the server a second identification message and the command message, the second identification message comprising information for identifying the second device,
wherein the first device and the second device are connected to the server via the Internet,
wherein the server comprises
a receiver configured to receive the first and second identification messages and to receive the command message,
server controller configured to establish a logic relationship between the first device and the second device based on the first and second identification messages and to provide the first instruction to the first device based on the logic relationship and the command message, further configured to access a data base to retrieve various information regarding specific properties and capabilities of the first device,
a content provider configured to provide the multimedia content based on the first instruction to allow the multimedia content to be displayed at least on the first display,
wherein the server is configured to obtain device information from the first device, said device information comprising information on whether communication between the server and the first device shall be carried out via push or pull communications,
wherein when the second device sends a message to the server for the first device, the server is configured to receive the message and to store the message in the data base; and then, without waiting for further queries or pull messages, the server is configured to send the message to the first device, thereby forwarding the message stored in the data base to the first device,
wherein the forwarded message is adapted to the properties and capabilities of the first device.

2. The system according to claim 1, wherein the server is connected to said data base and is configured to retrieve user information and device information from said data base and further configured to store the user information and the device information in said data base.

3. The system according to claim 1, wherein the server is connected to a content storage and is configured to transfer the multimedia content to the first device.

4. The system according to claim 1, wherein the system is configured to allow a user of the second device to initiate the displaying of the content on the first device.

5. The system according to claim 1, wherein the server is further connected to at least another first device and is configured to simultaneously display the same multimedia content on a plurality of connected first devices.

6. The system according to claim 5, wherein the system is further configured to allow a user of the second device to initiate the displaying of the multimedia content on the plurality of first devices.

7. The system according to claim 1, wherein at least one of the first device and the second device is configured to communicate with the server via pull requests.

8. The system according to claim 1, wherein both the first device and the second device are configured to use push-communication.

9. The system according to claim 1, wherein the first instruction to the first device contains information on the multimedia content that is to be displayed and/or information requesting permission from a user of the first device before displaying the multimedia content.

10. A method for displaying multimedia content on at least one first device using a second device, the method comprising:
transmitting a first identification message from the first device to a server via the Internet, the first identification message comprising information for identifying the first device;
receiving a user input with an input device in the second device, wherein the user input specifies the multimedia content to be displayed on a display of the first device, the first device also having one or several audio speakers;
creating a command message from the received user input in the second device;
transmitting the command message and a second identification from the second device to the server via the Internet;
receiving the first identification message, the second identification message and the command message in the server;
determining in the server a logic relationship between the first device and the second device based on the first and second identification messages, and, based on the logic relationship and the command message, providing a first instruction to the first device; and providing by the server the multimedia content to the first device based on the first instruction to allow the multimedia content to be displayed at least on the first display, wherein the method further comprises:

obtaining by the server device information from the first device, the obtained device information comprising information on whether the communication between server and first device shall be carried out via push or pull communications, accessing a data base to retrieve various information regarding specific properties and capabilities of the first device, receiving and storing a message in the data base, when the second device sends the message to the server for the first device, sending the message to the first device, thereby forwarding the message stored in the data base, without waiting for further queries or pull messages, wherein the forwarded message is adapted to the properties and capabilities of the first device.

11. The method according to claim 10, further comprising:

retrieving user information and device information from said data base and storing the device information and/or the user identification in said data base.

12. The method according to claim 10, further comprising:

communicating by at least one of the first device and the second device with the server via pull requests.

13. The method according to claim 10, wherein the server is connected with a plurality of first devices and allows a user of the second device to initiate the displaying of the multimedia content on the plurality of first devices.

14. The method according to claim 10, further comprising:

communicating with at least one of the first device and the second device using push-communication.

* * * * *